Oct. 16, 1928.  
F. L. BRYANT  
1,688,035  
VALVE  
Filed Dec. 31, 1925
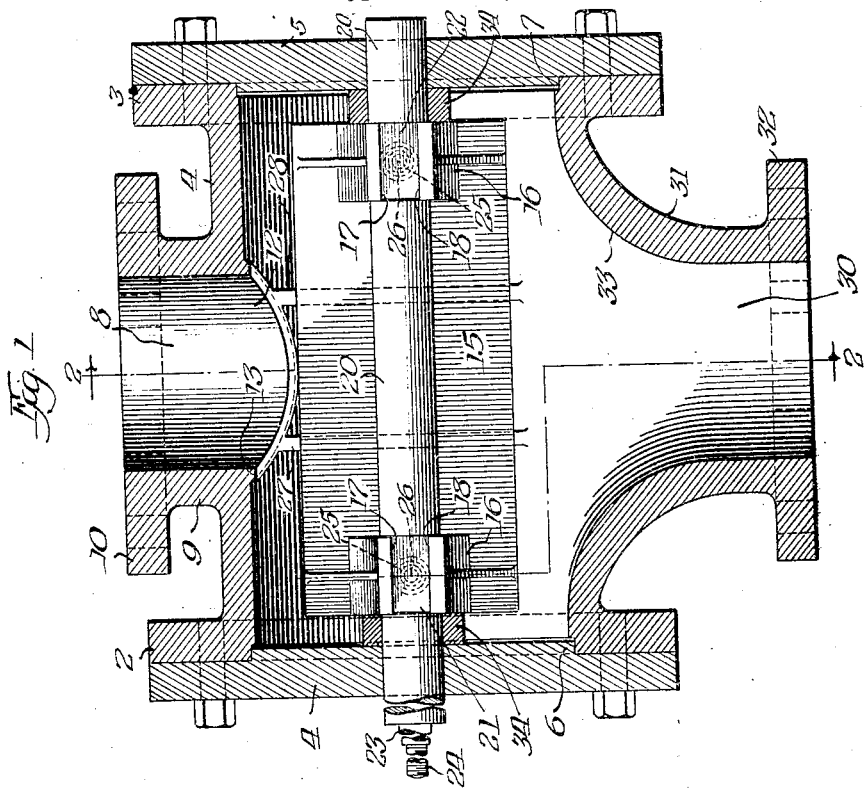
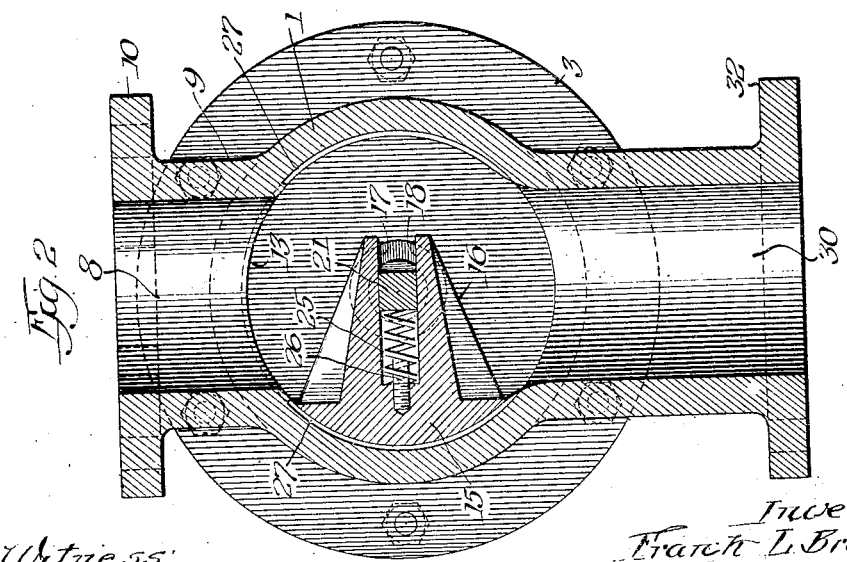
Witness:  
Inventor  
Frank L. Bryant Patented Oct. 16, 1928.

1,688,035

UNITED STATES PATENT OFFICE.

FRANK L. BRYANT, OF JOLIET, ILLINOIS.

VALVE.

Application filed December 21, 1925. Serial No. 78,505.

My invention relates to valves, and more particularly to valves for controlling the flow of pulverulent material and the like.

In handling dry material such as monocalcium phosphate in powder form, I find that the material tends to cause sticking of the usual controlling valves by forming a somewhat plastic or gummy deposit between the operating surfaces. This is true not only of the aforesaid material, but also of other materials particularly organic powders, pulverized coal, and the like.

Where a rotatable plug valve is used, great difficulty has been experienced in operating the same. I have found that this is due to two factors, namely, the extensive area of contact between the plug and the cage or housing, and the inability of the surfaces thus in engagement to clean themselves.

My invention provides a valve preferably in the form of a suitable plug having primarily a small area of contact between the parts. Furthermore, I provide a valve seat which is self cleaning. While I have made the seat self cleaning, it is within my invention to provide a cleaning means independently of the seat, or it is within my invention to reverse the relation of the parts, that is, to make the plug self cleaning instead of the valve seat.

While my invention is particularly applicable to the handling of powdered materials, it is to be understood that it is not to be limited to such, but the principles of the invention may be applied generally, and while I have shown in the accompanying drawings one particular embodiment in which my invention may appear, I do not intend to be limited to this specific embodiment nor to the specific details herein disclosed except as they appear in the appended claims.

Now in order to acquaint those skilled in the art with the construction and operation of my invention, I shall describe a specific embodiment in connection with the accompanying drawings.

In the drawings:—

Figure 1 is a vertical cross section; and Fig. 2 is a similar cross section taken at right angles to the view of Fig. 1 on the line 2—2.

The valve shown in the drawings comprises a generally cylindrical housing or barrel 1, the end of which terminates in the flanges 2, 3, to co-operate with the flanges of the cover plates 4, 5, which cover plates are piloted into the end of the barrel or housing 1, as indicated at 6, 7. Preferably these end plates 4 and 5 are made identical for ease of manufacture. The barrel or housing member 1 has an inlet passageway 8 defined by a relatively short neck 9 terminating in a clamping flange 10 for connecting the valve in the usual manner to flanged conductor pipes. The inlet passageway 8 terminates in a port 12 defined by the intersection of the inlet passageway 8 and the interior of the housing 1. The valve seat 13, which is of a special construction hereinafter more fully described, is formed at the junction of the inlet passageway and the interior of the valve and defines the port 12. This valve seat comprises a raised surface having sharp inner and outer edges or corners. The interior of the housing 1 is of such form as to permit the valve seat 13 to stand out in relief for engagement with the movable valve member 15. This valve member 15 is preferably a section of a cylinder of sufficient peripheral length to contact with and cover completely the valve seat 13 when the member 15 is moved to a position 90° clockwise from the position shown in Fig. 2.

This valve member 15 has at its end a pair of bracket members 16, 16 into which are cut the ways or guides 17 and 18. An operating shaft 20 extends through the end plates 4 and 5 having bearing in the same, and this shaft has squared portions at 21, 22, fitting the guides 17, 18. The shaft 20 has at its forward end a suitable coupling portion 23 to which a handle may be connected, this coupling portion terminating in a threaded stud 24 for holding the handle or operating wheel upon the coupling portion 23. The shaft 20 is coupled to the valve member 15 through the connections formed by the ways 17 and 18 embracing the squared portions 21 and 22. The valve member 15 is pressed radially from the shaft 20 by means of springs 25, 25, which lie in the groove or slot formed between the ways 17, 18, and press at one end against the squared portions 21, 22, and at their other ends against the bottom of the slot or groove formed by the ways 17 and 18, pins 26, 26 being threaded into the metal of the valve member 15 and guiding the ends of the springs. The pins 26 prevent lateral displacement of one end of the springs out of each groove defined by the ways 17 and 18. The portions 21, 22 need not be squared, they may be merely flattened by cutting away opposite sides so as to give parallel surfaces to fit between the guides 17, 18 and to permit the shaft to operate the plug member.

Since the seat 13 is set out in bas-relief from the inner cylindrical surface of the housing 1, the valve member 15 which is pressed outwardly by the springs 25, 25, would unless other means were provided tend to drop off of the seat 13 and require lifting to get back onto the same if the valve were moved into the position shown in Fig. 2. In order to avoid this I have provided adjacent the seat 13 raised ribs 27 and 28 upon each side of the valve seat 13. These ribs are shown as extending peripherally in a straight line on the interior of the housing or barrel member 1, but may be made in any other preferred manner, their essential function being to hold the valve member 15 clear of the inner surface of the barrel or housing 1, and in substantially the same radial position with respect to the axis of rotation as such valve member will occupy when in closed position. In other words, the ribs or guides 27 and 28 have their inner surfaces machined off on the same cylindrical surface which defines the valve seat member 13. As clearly shown in Fig. 1, the ribs 27 are spaced apart a distance less than the diameter of the rim or valve seat 13. This interrupts the continuity of the ribs so that rim 13 acts to effectively scrape and clean the operating face of the valve throughout the entire diameter of the valve port upon turning of the valve. The valve is thus rendered self-cleaning and gumming thereof due to collection of material between the ribs and the valve, such as would occur if the ribs 27 were continuous, is avoided.

The housing or barrel member 1 has an outlet passageway 30 which is formed by a curved tapered neck 31 having a bolting or clamping flange 32 for connecting the valve in a run of flanged pipes or the like. The neck 31 is flared with a gentle curvature, as indicated at 33, to assist the flow of material outwardly without tending to clog the outlet and to prevent the lodgment of loose material in the lower part of the valve. It will be obvious to those skilled in the art that the outlet may be made like the inlet and may have a valve seat such as 13 at the junction of the two portions.

Endwise motion of the valve member 15 is restrained by spacing collars 34, 34 on the shaft 20 lying between the end plates 4 and 5 and the adjacent brackets 16, 16.

It is believed that the operation of the valve is apparent from the foregoing detail description. When the valve is in the position shown in Figs. 1 and 2, the valve port 12 is opened as the valve member 15 lies to one side of the passageway extending from the inlet 8 through the valve port 12, the body of the valve 1 and the outlet 30. The valve body 15 is pushed out radially by the springs 25 into engagement with the ribs or guides 27, 28, and without change of radial position this valve 15 may be rotated about the axis of the shaft 20 into position to seat upon the valve seat 13 and close the port 12. It will be observed that the area of contact between the ribs 27, 28 and the valve body 15 is very small, and hence even if there is a tendency for a gummy deposit to be formed, the opposition to motion is greatly reduced because of the small area in contact. As the valve passes over onto the seat 13 the sharp edges of the seat 13 have an opportunity for scrapping and cleaning off any coating or loose material on the cylindrical face of the valve 15.

While I have shown the port 12 as being formed at the intersection of two substantially right cylinders and have shown the valve member 15 as being a portion of right cylinder, it is to be understood that the geometric form of these parts may be varied without departing from the invention. The cooperating seat 13 and valve member 15 should be complementary parts of a figure or solid generated by rotation.

Preferably the raised rim 13 and the ribs 27 and 28 are cast integral with the housing 1 and are machined off at one operation to a true cylindrical surface in the form shown.

I claim:—

1. In a valve, a barrel having a straight cylindrical inlet passageway terminating in a port and an aligned outlet passageway terminating in the barrel in an inwardly flared port, a straight transverse rocking shaft in said barrel extending completely therethrough, a single valve member having a curved cylindrical bearing surface and a substantially flat back, said member being connected to the said shaft at the ends of the barrel and out of line with the ports, said barrel having a raised rim about one of said ports, said rim being faced off to form a valve seat to contact with said plug member to form a tight joint, said valve being adapted to be moved wholly to one side of said inlet and outlet when open to provide a minimum obstruction for the passage of material through the barrel.

2. In a valve, a barrel member having an inlet port and an outlet port in alignment, a rocking shaft extending through said valve, a single rocking valve member having a curved cylindrical surface, said valve member being connected to the shaft, said barrel member having on its inner surface a raised rim about one of said ports to form a narrow valve seat for said valve member, and raised ribs lying flush with the valve seat and separated by a space less than the diameter of the rim to provide guides for holding the valve in line with the seat.

3. In a valve, a cylindrical barrel, caps of identical construction for the ends of the barrel, transverse inlet and outlet ports for the barrel in direct alignment with each other, a valve seat about one of said ports in relief on the interior surface of the barrel, narrow guides forming continuations of the valve seat spaced apart a distance less than the diameter of the valve seat, and a solid valve member co-operating with the valve seat and adapted to be held in line therewith by said guides.

4. In combination, a valve housing comprising a substantially cylindrical barrel member, similarly constructed end plates for the barrel member, a straight rock shaft having bearings in said end plates, said shaft having parallel opposite notches adjacent each end of the housing, said housing having an inlet port and an outlet port, a valve member for closing one of said ports, said valve member comprising a segment of a cylinder having brackets, slots in said brackets, said slots embracing said notched portions of the shaft and being guided endwise thereby, and springs between the valve member and the shaft for pressing the valve member radially outward from the shaft.

5. In a valve, a housing comprising a substantially cylindrical barrel having an inlet and an outlet passageway, caps for closing the ends of the barrel, a straight shaft having bearings in said caps, said shaft having two oppositely notched portions, a valve body in said barrel comprising an outer cylindrical surface co-operating with the inner surface of the barrel member, said valve having brackets at its ends with slots in the brackets embracing the notched portions of the shaft, and being held against endwise movement thereby, and spring means between the shaft and the valve member for forcing the valve member radially outward from the shaft, and means for holding the valve endwise out of contact with the housing.

6. A valve for controlling the flow of pulverulent material in a vertical conduit comprising a cylindrical barrel adapted to be disposed horizontally, said barrel having an inlet at its upper side and an outlet at its lower side, the junction of the outlet and the interior of the barrel being well rounded to prevent lodgment of the material handled, the junction of the inlet and the barrel having an annular raised rim forming a narrow valve seat, raised ribs flush with the seat formed on the inner surface of the barrel, an axial shaft for the barrel, a valve comprising a segment of a cylinder supported on said ribs and adapted to slide from said ribs onto said seat, arms connecting the valve and the shaft, said arms permitting radial motion between the valve and the shaft, and spring means for pressing said valve outwardly radially.

7. A valve for controlling the flow of pulverulent material in a vertical conduit comprising a cylindrical barrel adapted to be disposed horizontally, said barrel having flanged ends, end plates of like construction secured to said flanged ends, said barrel having an inlet at its upper side and an outlet at its lower side, the junction of the outlet and the interior of the barrel being flared to prevent lodgment of the material handled, the junction of the inlet and the barrel having an annular raised rim forming a narrow valve seat, raised ribs flush with the seat formed on the inner surface of the barrel on each side of the seat, a straight axial shaft for the barrel having bearings in the end plates, said shaft having oppositely disposed parallel notches adjacent each of the end plates, a valve comprising a segment of a cylinder supported by said ribs and by said seat, said valve having slotted brackets for embracing the notches in the shaft, said brackets being out of the line of the inlet and outlet to present a minimum obstruction, and radially disposed springs guided in the notches in said brackets for pressing said valve out radially.

8. In a valve structure, a barrel member having an inlet port and an outlet port, said barrel having an inwardly projecting rim about one of the ports forming a valve seat, a valve rockably mounted in the barrel and having a cylindrical surface for co-operation with said seat to close the port, means for moving the valve into and out of operative position, and raised ribs lying flush with the valve seat and separated by a space less than the diameter of the rim to provide guides for holding the valve in the line with the seat.

9. In a valve structure, a barrel member having an inlet port and an outlet port, said barrel having an inwardly projecting rim about one of the ports forming a valve seat, a valve rockably mounted in the barrel and having a cylindrical surface for cooperation with said seat to close the port, means for moving the valve into and out of operative position, and raised ribs lying flush with the valve seat and spaced away from the rim at points diametrically opposite thereof in the direction of the axis of movement of said valve, the ribs providing guides for holding the valve in line with the seat.

In witness whereof, I hereunto subscribe my name this 28th day of December, 1925.

FRANK L. BRYANT.